Aug. 11, 1936.  W. H. EVERS  2,050,299
MOLD FOR PRODUCING CORRUGATED UNITS
Filed Nov. 14, 1934  3 Sheets-Sheet 1
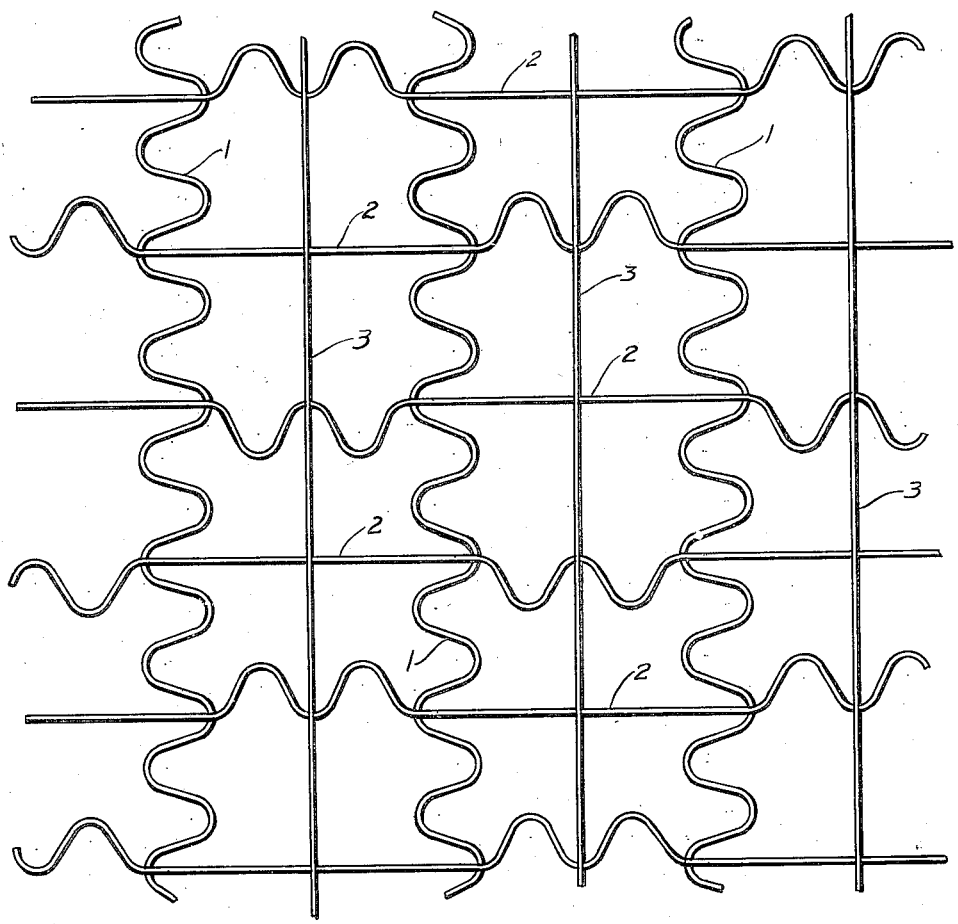
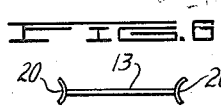
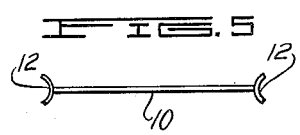
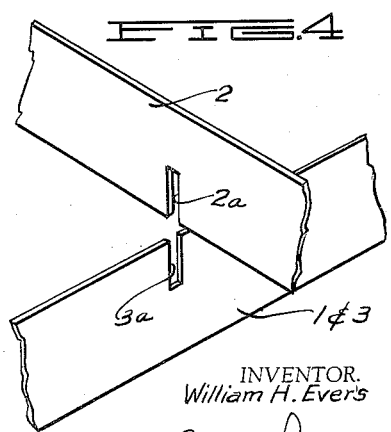
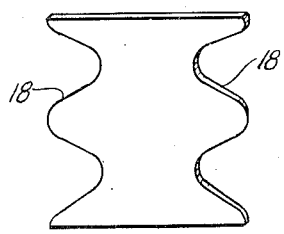
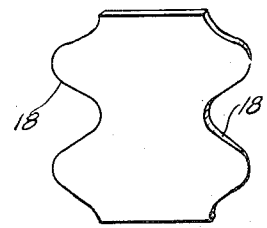
INVENTOR.
William H. Evers
BY John A. Bommhardt
ATTORNEY.

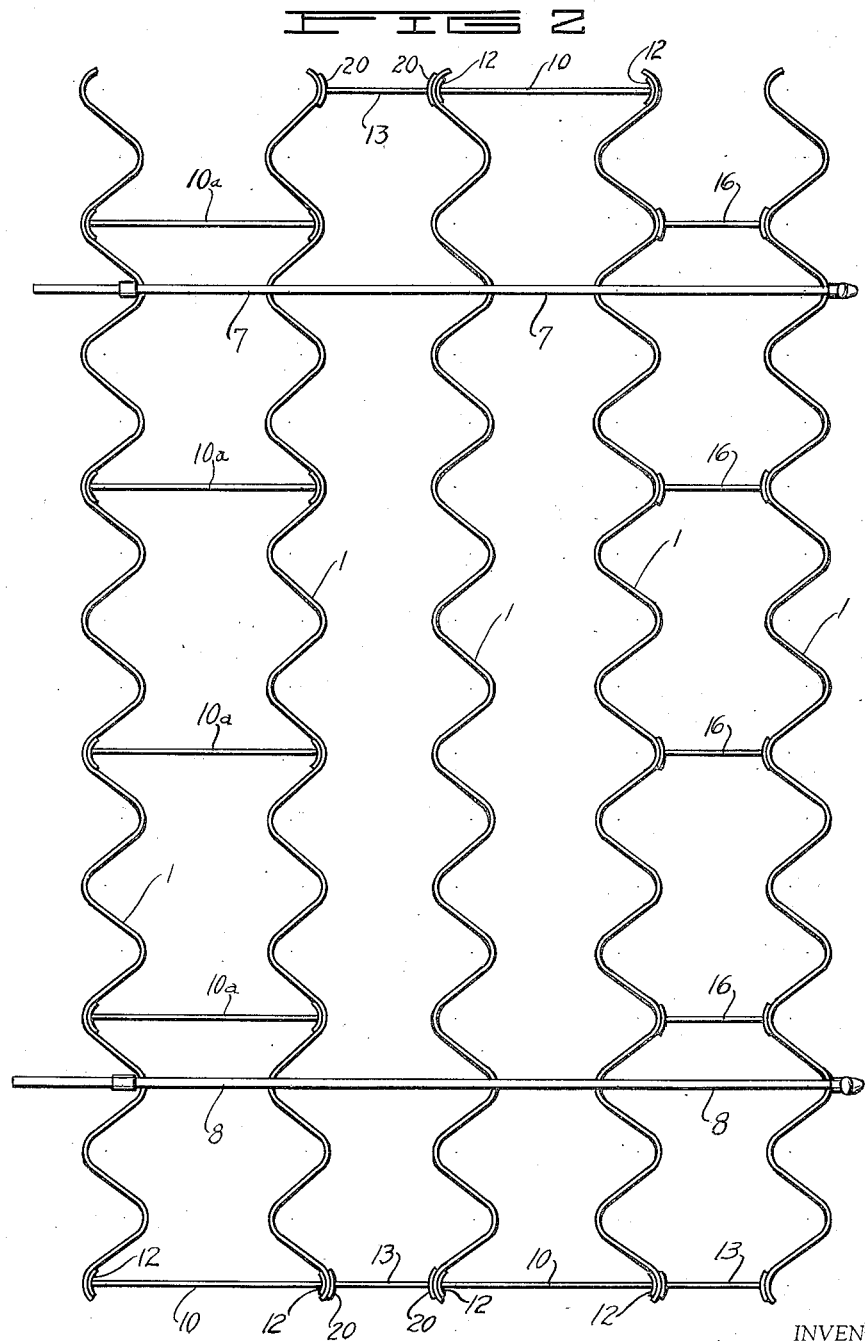

Aug. 11, 1936.   W. H. EVERS   2,050,299
MOLD FOR PRODUCING CORRUGATED UNITS
Filed Nov. 14, 1934   3 Sheets-Sheet 3
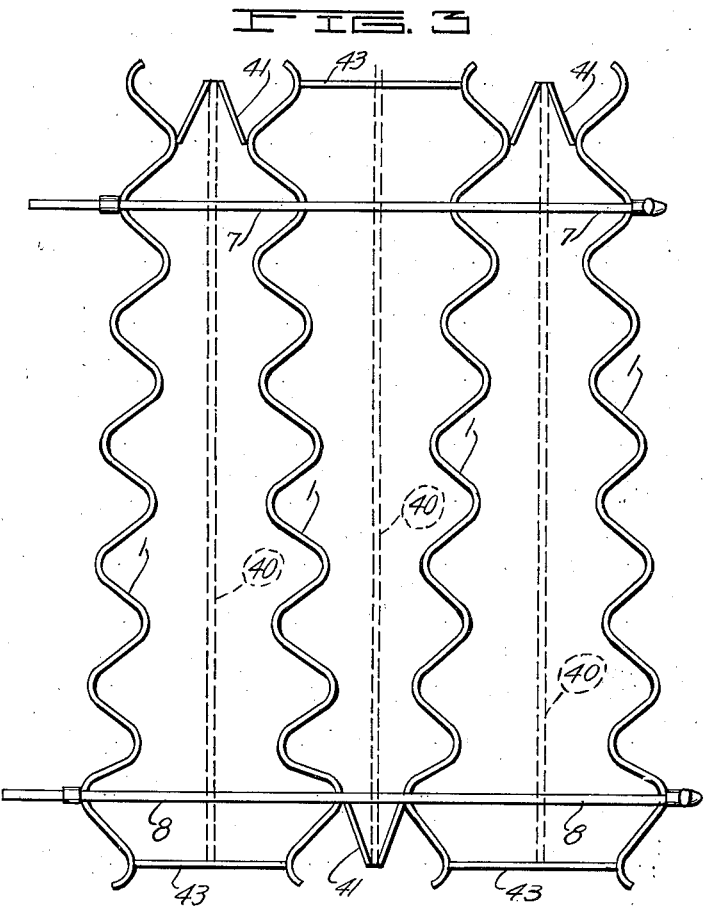
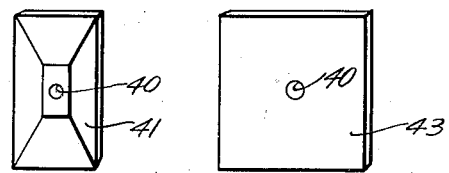
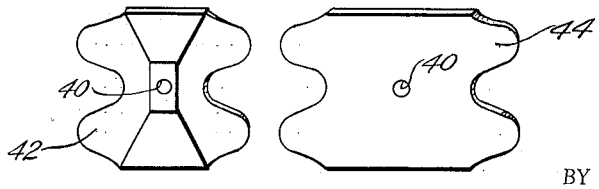
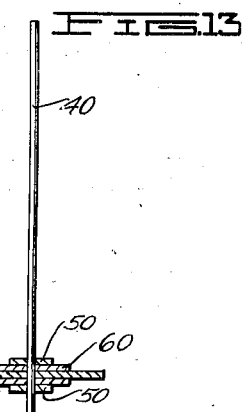
INVENTOR.
William H. Evers
BY
ATTORNEY.

Patented Aug. 11, 1936

2,050,299

UNITED STATES PATENT OFFICE 2,050,299

MOLD FOR PRODUCING CORRUGATED UNITS

William H. Evers, Cleveland, Ohio, assignor to Preplan, Inc., Cleveland, Ohio, a corporation of Ohio Application November 14, 1934, Serial No. 752,912

2 Claims. (Cl. 25—121)

This invention relates to molds, used for the production of precast units composed of concrete or other artificial building composition, and has for its object to provide improved assemblies for the molding of corrugated units.

It is the intention of this invention to provide assemblies producing units having corrugated sides which will readily assemble in interlocking formation within their respective planes.

The invention includes methods of assembling the corrugated sections of the mold so that various units can be molded, such as tile, block, beams and pile.

The invention has for another object, the simplifying of the parts of the mold, so that these parts readily interlock in firm relationship to each other in assembly, so that the precast units molded therein are perfect in alignment in length and in corrugation.

This invention includes a method of assembling corrugated plates, and positioning plates, forming a mold whereby both sides of the corrugated plates are used at the same pouring, producing units freely interlocking.

The corrugated plates shown herein are all shown as curved corrugations, but any other corrugations in plates can similarly be used, be they of V shaped, circular, square, rectangular or other standard shaped corrugated sections, for a mold.

The advantage of this mold for the production of perfectly shaped, corrugated precast units are herein described in reference to the drawings, in which Figure 1 is a top view of a multiple mold set up according to invention, for the casting of tile. Figure 2 is a top view of a multiple mold assembled for the production of blocks and beams. Figure 3 is a top view of a multiple mold assembled for the production of pile. Figure 4 is a detail of the interlocking plates. Figures 5 and 6 are details of end plates when the corrugated plane of the finished product runs perpendicularly. Figures 7 and 8 are sections of the finished products which are also cross sections of end plates used when the corrugated plane of the finished product runs longitudinally. Figures 9 to 12 are details of end plates or shoes of various pile molds. Figure 13 is a detail showing the insertion of a pipe in a block or pile.

In all these Figures 1, 2 and 3, the corrugations of the plates shown run perpendicularly to the longitudinal plane of the plate, with the result that all precast units cast therein will have corrugated planes running perpendicularly to the length of the manufactured unit. In the production of the beams, blocks or pile wherein it may be desired to have the corrugated plane running longitudinally in the finished unit, this can readily be done as will herein be described.

Referring specifically to the drawings, 1 in Figures 1-2 and 3 are perpendicularly corrugated steel plates, all of gauge necessary to maintain perfect alignment and rigidity in the mold, with the corrugation of exact pitch. These corrugated plates are set up perpendicularly upon a steel plated floor or platform, and are of the exact depth of the precast product, be it tile, block, beam or pile.

In Figure 1, 2 are separator plates, of same gauge as the corrugated plates 1, flat in part and perpendicularly corrugated in part as shown in drawings, and 3 are flat separator plates of the same gauge.

All these plates 1-2 and 3 are of the same depth, interlocking by slots 2a and 3a to hold mold in fixed assembly at all intersections in assembly of these plates, as shown in Figure 4. The assembly must be thoroughly oiled to prevent adhesion of the cast concrete or other artificial building composition, so that the mold can be stripped from the finished cast after it is set.

Figure 4 shows the simplicity of interlocking arrangement consisting only of rectangular slits or cut slots 2a and 3a as shown. These slots are cut at exact center of the intersections or crossing points of the plates, are of equal depth, slightly wider than the gauge of plates, 2a showing the grooves cut in plates 2 of Figure 1, and 3a showing grooves in plates 1 and 3 Figure 1. The assembly interlocked as described is set up on oiled steel plated floor or platform completing the mold for casting corrugated tile.

In Figure 2, 1 are the corrugated plates set up perpendicularly on the steel plated floor or platform, all parallel to each other and separated by end plates or separator plates Figures 5 and 6 which are positioned at right angles to the longitudinal plane of the corrugated plates, and must have the exact cross section of the finished cast. This mold is assembled to produce beams and blocks, therefore the corrugated plates, the end plates and the separator plates must be exact depth of the desired precast product. The end plates used to fix ends of beams are exact cross section of the end of the beam to be cast, and if this beam is manufactured with its opposite sides corrugated perpendicularly to its length as will be produced by use of mold shown in Figure 2 the end plate is of the design shown in Figure 5, in which 10 is a flat plate of same gauge as used for the corrugated plates 1, and 12 are curved plates of same radius as the radii of the corrugated plate at the point of positioning of the end plate within the mold, which curved plates 2 are spot welded to the ends of the flat plate. The positioning of these end plates in the assembled mold is shown in Figure 2 at 10.

These end plates can also be used as separator plates for the casting of block as shown in Figure 2 at 10a. If it is desired that the beams have a different corrugated end, or if the cast blocks be of different corrugated sides, the end plate Figure 6 is used in which 13 is a flat plate of same gauge as the corrugated plate 1 and 20 are curved plates or flanges of same radii as the radii of the corrugated plate at the point of position of the end plate within the mold which curved plates are spot-welded to the ends of the flat plate 1. The positioning of these end plates in the assembled mold is shown in Figure 2 at 13. These end plates are also used for the production of block, and are then positioned as 16 in Figure 2.

The mold Figure 2 is rigidly clamped together by use of long reach standard clamps as at 7—7 and 8—8 which clamps are standard and readily purchased in the open market. These clamps firmly pulling the longitudinal corrugated plates together, position the end plates also the separator plates firmly into respective positions by reason of the radial interlocking of the curved sections 12 of Figure 5 and 20 of Figure 6 within the curvature of the corrugated plates Figure 2.

The assembly is clamped together as described and set up on steel plated floor or platform, the whole thoroughly oiled completing the mold for casting either beams or blocks as described herein. For the production of beam or block wherein the casting should have corrugations running longitudinally with their lengths instead of perpendicularly as shown in mold Figure 2, the assembly for the mold is identically the same, excepting that the corrugated plates 1 in Figure 2 are found with corrugations running longitudinally and the end plates and the separator plates are preferably made of cast iron, with a minimum thickness of metal of ½ inch and must have the exact cross section of the finished cast, as shown in Figures 7 and 8.

Figures 7 and 8 give the cross section of the finshed products, in which 18 is the exact form of the corrugated plate. These plates are set in the mold in exact position as described above for the positioning of plates Figures 5 and 6, and by reason of the width of these end and separator plates and by reason of their sides being of same corrugated design as that of the corrugated plates 1, these end and separator plates firmly interlock, when the whole assembly is clamped together as described above for Figure 2 to assemble the mold upon steel plated floor or platform ready for the pouring through the top of the mold, the cementitious composition used to cast the products of block or beam.

In Figure 3, 1 are the corrugated plates set up perpendicularly on the steel plated floor or platform to produce tapering units as for pile. This mold is assembled exactly as is described for assembling mold Figure 2, excepting that the end plates are different as herein described.

The mold as shown in Figure 3 would produce pile with two flat sides parallel to each other and with the other two sides tapering and with corrugated planes, these corrugations running squarely across the tapering sides.

By using steel plates with corrugations running longitudinally instead of perpendicularly in plates 1 as shown in Figure 3 the resulting cast would produce a pile with two flat sides parallel to each other, and the other two sides tapering with their corrugations running longitudinally with the length of the pile as cast in the mold. A corrugated pile has the structural advantage over the ordinary pile used, in that its corrugated faces, add much to the adhesive area of the pile, developing much more bearing power. This molded pile is most readily driven by the use of water jet, and the end plates are therefore so designed that provision is made for positioning of a pipe from end to end of the cast pile, located in its true center, and which the pipe incidentally firmly fixes the position of the cap of the pile, also of the shoe of the pile, as end plates. Figure 9 is bottom view of the cast steel shoe 41, as shown in the mold Figure 3, and in which 40 shows the end of the pipe 40 Figure 3. Figure 10 is bottom view of the cast shoe 42, required when plates 1 in mold Figure 3, have corrugations running longitudinally.

Figure 11 is plan view of top plate 43 of the cast pile, as shown in the mold at 43 Figure 3, and in which 40 shows the end of the pipe. Figure 12 is the plan view of the top plate 44 of the cast pile, required when plates 1 in mold Figure 3 have corrugations running longitudinally.

The fixed position of the shoe and top plates in the mold and whereby they serve as end plates, is readily accomplished as shown in Figure 13. wherein 40 is the pipe necessary for the water jet; both ends of this pipe are threaded passing through the cast steel shoe and also the top plate, as shown in Figures 9–10–11 and 12. In Figure 13 it is shown in cross section how the cast steel shoe and the top plate are held in firm position by the pipe 40 to fix the length of the cast unit, 70 being the plate end of shoe or cap, 60 being washers on either side of the plate which are positioned by nuts 50. The completed assembly Figure 13 is then positioned in mold as 40—41 and 43 in Figure 3, the mold is firmly tightened by use of long reach clamps as herebefore described at 7—7 and 8—8 in Figure 2, the assembly set up on steel plated floor or platform ready to receive the poured concrete or other artificial building compositions.

I claim:

1. A mold consisting of corrugated side plates set up perpendicularly and out of parallel to each other so that resulting poured units are tapering or wedgeshaped, and a cast steel shoe and top plate firmly positioned in the mold by being attached to a pipe used for driving the finished casting with water jet, the corrugated plates, steel shoe and top plate being clamped by long reach clamps engaging the side plates.

2. A pile mold comprising side plates, a shoe and a cap for the pile, held between opposite ends of the side plates, and a pipe extending lengthwise between the side plates and secured at its ends to the shoe and cap respectively; said pipe adapted to be molded in the pile.

WILLIAM H. EVERS.